Patented May 9, 1944

2,348,244

UNITED STATES PATENT OFFICE 2,348,244

DELAYED-ACTING HARDENER FOR FORMALDEHYDE-UREA ADHESIVES

William C. Dearing, Toledo, Ohio, assignor, by mesne assignments, to Libbey-Owens-Ford Glass Company, a corporation of Ohio No Drawing. Application September 17, 1940
Serial No. 357,123

3 Claims. (Cl. 260—29)

The invention relates to a delayed-acting hardener for formaldehyde-urea adhesives, and also relates to the preparation of formaldehyde-urea adhesives having delayed-hardening properties.

An aqueous solution of a formaldehyde-urea reaction product is valuable as an adhesive or a coating composition, because the reaction product in such a solution can be caused to become insoluble after the solution has been applied, to produce a water-resistant adhesive bond or surface coating. A formaldehyde-urea reaction product in aqueous solution is superior to other resin-formers in the ease and rapidity with which it can be converted into the insoluble state after being applied. Plywood that has been glued with an aqueous solution of a formaldehyde-urea reaction product, unlike plywood that has been glued with other thermosetting adhesives, does not need to be subjected to an elevated temperature in a heated press in order to convert the formaldehyde-urea reaction product into the insoluble resin. Expensive hot-pressing equipment is not necessary when an aqueous solution of a formaldehyde-urea reaction product is used as an adhesive, because such an adhesive, after being applied, can be converted at ordinary temperatures into an insoluble resinous bond by the action of a hardening agent that renders the composition acid and thus causes the formaldehyde-urea reaction product to harden or become insoluble. The hardening agents heretofore used in ordinary commercial practice are ammonium chloride and ammonium thiocyanate, which are not strongly acid in themselves, but which react with the free formaldehyde that is present in an aqueous solution of a formaldehyde-urea reaction product to form strongly acid hexamethylenetetramine salts.

However, when an ammonium salt of a strong acid is added to an aqueous solution of a formaldehyde-urea reaction product in sufficient amount to cause the reaction product to harden after the solution has been applied as an adhesive, the hardening takes place so rapidly that there is not sufficient time to apply the solution as an adhesive in ordinary practice.

The principal object of the invention is to provide novel agents which, when used with an aqueous solution of a formaldehyde-urea reaction product and an ammonium salt of a strong acid, produce an adhesive that remains stable for a time, to permit it to be applied, and then hardens rapidly to produce a water-resistant bond. More specific objects and advantages are apparent from the description, which merely discloses and illustrates the invention and is not intended to impose limitations upon the claims.

An adhesive composition embodying the invention comprises a water-soluble formaldehyde-urea reaction product and a substance selected from the group consisting of magnesium oxide, magnesium hydroxide, zinc oxide and zinc hydroxide. Such a composition, when brought together in an aqueous medium with an ammonium salt of a strong acid, forms an adhesive having delayed-hardening properties.

Such an adhesive composition may consist of a dry solid containing the formaldehyde-urea reaction product and the oxide or hydroxide, which requires the addition of water, as well as an ammonium salt of a strong acid, in order to produce a delayed-hardening adhesive. An adhesive composition embodying the invention may also comprise a suspension of one of the above oxides or hydroxides in an aqueous solution of a water-soluble formaldehyde-urea reaction product. At ordinary temperatures this composition remains stable for considerable periods of time. The addition of an ammonium salt of a strong acid to the composition produces a delayed-hardening adhesive.

The oxide or hydroxide of magnesium or zinc does not affect the stability of an ordinary water-soluble formaldehyde-urea reaction product. A dry formaldehyde-urea reaction product or a water solution thereof is just as stable after such an oxide or hydroxide has been incorporated as it would have been if the oxide or hydroxide had been omitted.

The oxides and hydroxides above mentioned are believed to be the first commercially usable substances that, when incorporated with a solid water-soluble formaldehyde-urea reaction product or an aqueous solution thereof, have been found to produce a composition that upon addition of an ammonium salt of a strong acid forms an adhesive having delayed-hardening properties, which do not also tend to render the formaldehyde-urea reaction product unstable in storage or shipment. For example, any substances other than such oxides and hydroxides which might be expected to produce a similar effect cannot be added in commercial practice to an aqueous solution of a formaldehyde-urea reaction product without rendering the solution unstable, and thus unfit for shipment or sale as a commercial adhesive.

It is highly advantageous to incorporate the oxide or hydroxide of magnesium or zinc with a formaldehyde-urea reaction product that is sold in the form of a solid or an aqueous solution, for use as an adhesive, because the addition of an ammonium salt of a strong acid to the resulting composition produces an adhesive having delayed-hardening properties. If the ammonium salt of the strong acid is supplied by the manufacturer of the formaldehyde-urea reaction product, the salt may be shipped separately and added by the user just before the adhesive is applied. In that case, it is advantageous to have the oxide or hydroxide incorporated with the formaldehyde-urea reaction product, rather than with the ammonium salt, in order to reduce the amount of material that must be shipped and handled separately. If the manufacturer of the formaldehyde-urea reaction product does not supply the ammonium salt, it is likewise desirable to have the oxide or hydroxide incorporated with the formaldehyde-urea reaction product so that the user will not be required to add more than one ingredient, and will only be required to add the ammonium salt.

A delayed-acting hardener embodying the invention, which can be added to any water solution of a formaldehyde-urea reaction product to produce a delayed-hardening adhesive, comprises an ammonium salt of a strong acid and an oxide or hydroxide of magnesium or zinc. This hardener is preferably in the form of a dry mixture of the ammonium salt with the oxide or hydroxide, because a dry mixture is the most convenient form for shipment.

Ordinarily an ammonium salt of a strong acid cannot be added to a water-soluble formaldehyde-urea reaction product until just before the reaction product is applied as an adhesive or coating composition, because the gelling or conversion of the formaldehyde-urea reaction product into an insoluble resin begins as soon as the ammonium salt is added. Thus it is ordinarily necessary to ship the ammonium salt of the strong acid separately from the formaldehyde-urea reaction product, and to rely upon the user to add the correct proportion of the ammonium salt just before the solution of the formaldehyde-urea reaction product is applied. A formaldehyde-urea reaction product to which the user must add a hardening agent is not suitable for domestic use, because there are no facilities in the ordinary home for measuring out the exact amount of hardening agent required for use with a given quantity of a water-soluble formaldehyde-urea reaction product.

Accurate measurement of the amount of hardening agent to be added to a given quantity of a water-soluble formaldehyde-urea adhesive is important. If too much hardening agent is added, the adhesive may gel or harden so rapidly that there is no time for applying it. If too little hardening agent is added, the adhesive will not harden properly, and will not produce a satisfactory bond.

In commercial practice an ordinary ammonium salt of a strong acid, such as ammonium chloride, cannot be added even to a dry water-soluble formaldehyde-urea reaction product, because the addition of dry ammonium chloride to a dry water-soluble formaldehyde-urea reaction product causes rapid hardening of the reaction product, even in the dry state, so that the mixture soon becomes insoluble and worthless.

A dry composition comprising a water-soluble formaldehyde-urea reaction product and the oxide or hydroxide of magnesium or zinc, in admixture with an ammonium salt of a non-volatile strong acid, such as ammonium sulfate, ammonium dihydrogen phosphate, diammonium hydrogen phosphate or ammonium oxalate, constitutes a stable dry adhesive composition embodying the invention. Ammonium oxalate, when used in this composition, may contain 2 mols of water of crystallization for each mol of ammonium oxalate. Such a dry mixture is stable over long periods of time. Its stability is not appreciably different from the stability of the dry formaldehyde-urea reaction product alone containing no hardening agent. Upon addition of water to the dry mixture, however, a delayed-hardening adhesive is formed. Such a dry mixture is suitable for domestic use as an adhesive, because a delayed-hardening adhesive is prepared by simply adding water to the dry material. The batch of adhesive solution prepared from the dry mixture may be as small or as large as desired, and it always contains the correct proportion of hardener.

Since the hardening agent is already contained in such a mixture, it is not necessary for the user to weigh out successive portions of hardening agent as successive portions of adhesive are removed from the container. Each batch of adhesive solution can be made up as it is needed, by simply removing the desired amount of the dry mixture from the container and dissolving it in water.

The term "strong acid" is used herein to denote an acid that is strong enough so that a one-per cent aqueous solution of the acid has a pH not greater than about 4. An ammonium salt of a weaker acid cannot be employed successfully as a hardening agent, because it would not render the aqueous solution sufficiently acid to make it harden properly after being applied. Although ammonium salts of non-volatile strong acids may be used in a stable dry adhesive composition embodying the invention, an ammonium salt of a strong volatile acid, such as ammonium chloride, ammonium thiocyanate or ammonium nitrate, cannot be used in a dry mixture with a water-soluble formaldehyde-urea reaction product. An ammonium salt of a strong volatile acid would cause the formaldehyde-urea reaction product in such a mixture rapidly to become insoluble, and an ammonium salt of a strong volatile acid cannot be added until just before the composition is applied.

As used herein, the term "dry adhesive composition" denotes a composition that is dry to the touch. A formaldehyde-urea reaction product that is dry to the touch, such as the product obtained by spray-drying an aqueous solution of a formaldehyde-urea condensation product, may contain 1 or 2 per cent of moisture, and such an amount of moisture does not affect the stability of a mixture embodying the invention. The percentage of moisture in a mixture embodying the invention may be increased without appreciably impairing its stability at ordinary temperatures until the composition is in the form of a gummy mass. However, such a gummy mass is not salable in commercial practice, because it is extremely difficult to dissolve in water. A dry mixture embodying the invention is preferably in granular or powdered form, so that it will dissolve rapidly upon the addition of water.

In the preparation of a dry mixture embodying the invention, for use as an adhesive, crystals of the ammonium salt may simply be mixed with the granular or powdered formaldehyde-urea reaction product and the oxide or hydroxide of magnesium or zinc. These three ingredients may be brought together and mixed in one operation, or a suspension of the oxide or hydroxide in an aqueous solution of the formaldehyde-urea reaction product may be prepared first and evaporated in a spray-drier or vacuum drum-drier, to produce a granular or powdered solid with which the ammonium salt of the non-volatile strong acid may be mixed. Preferably, the composition is not ground in a ball mill or other pulverizing apparatus after the ammonium salt of the non-volatile strong acid has been added to the formaldehyde-urea reaction product. If a dry composition or aqueous solution containing a formaldehyde-urea reaction product is to be stored for a substantial period of time or shipped a substantial distance, the formaldehyde-urea reaction product should be prepared in a substantially neutral condition, because a formaldehyde-urea reaction product that is appreciably acid or strongly alkaline is unstable even when no hardening agent whatsoever has been added to it.

Regardless of the form in which the formaldehyde-urea reaction product is shipped to the user, whether in the form of a solid or in the form of an aqueous solution, and regardless of the stage at which the ammonium salt of the strong acid or the oxide or hydroxide of magnesium or zinc is added to the formaldehyde-urea reaction product, the essential purpose of the invention is the preparation of a composition from water, a water-soluble formaldehyde-urea reaction product and the oxide or hydroxide of magnesium or zinc, which is applied, together with an ammonium salt of a strong acid, as an adhesive.

When an ammonium salt of a volatile or non-volatile strong acid is incorporated in an aqueous solution of a formaldehyde-urea reaction product, the salt reacts with the free formaldehyde that is present in the solution, to form the hexamethylenetetramine salt of the same acid. Since this hexamethylenetetramine salt is much more acid than the original ammonium salt, the reaction causes the solution to become acidified. Then, as soon as the acidity of the solution has reached about pH 4, the acid condition of the solution causes the hardening of the formaldehyde-urea reaction product to become appreciable; the greater the acidity of the solution, the greater is the speed of hardening.

When an ammonium salt of a strong acid is added to an ordinary aqueous solution of a formaldehyde-urea reaction product, there is an immediate sharp increase in acidity, followed by a further gradual increase. It has been discovered that the immediate sharp increase in acidity is caused by the combining of the free formaldehyde in the solution with some of the ammonium salt, to form a strongly acid hexamethylenetetramine salt, and that the further gradual increase in acidity is caused by formaldehyde which is gradually split off from the formaldehyde-urea reaction product, and which combines with more of the ammonium salt as fast as it is split off. The resulting gradual formation of additonal hexamethylenetetramine salt causes the gradual increase in acidity that follows the initial sharp increase in acidity.

In its normal state of equilibrium, the solution of the formaldehyde-urea reaction product contains a certain concentration of free formaldehyde. Upon the addition of the ammonium salt, when this free formaldehyde is suddenly used up by reaction with the ammonium salt, the equilibrium of the solution is disturbed. Additional formaldehyde is then gradually split off from the formaldehyde-urea reaction product, because the tendency is toward restoration of equilibrium. So long as the solution contains an excess of the ammonium salt, the normal concentration of free formaldehyde cannot be restored, and formaldehyde continues to be split off from the formaldehyde-urea reaction product as the tendency toward restoration of equilibrium continues. Thus, after the initial sharp increase in acidity which occurs upon addition of the ammonium salt, the further gradual increase in acidity continues until the ammonium salt has all been converted into a hexamethylenetetramine salt, or until the formaldehyde-urea reaction product has completely hardened.

When an adequate quantity of an ammonium salt of a strong acid is incorporated in an ordinary aqueous solution of a formaldehyde-urea reaction product, containing no oxide or hydroxide of magnesium or zinc, the initial sharp increase in acidity is so great that the solution hardens too rapidly to permit it to be applied as an adhesive in ordinary practice. If the solution is to be used as an adhesive, it is ordinarily necessary to resort to a serious reduction in the amount of ammonium salt used, so that the adhesive may not become acid enough to harden satisfactorily after it has been applied.

In accordance with the invention, this difficulty is overcome by incorporating in the adhesive solution the oxide or hydroxide of magnesium or zinc. Such substance is initially in suspension in the aqueous adhesive solution. As soon as the ammonium salt of the strong acid is incorporated in the aqueous adhesive solution containing such oxide or hydroxide, the ammonium salt begins to react with the free formaldehyde in the solution to form the hexamethylenetetramine salt, and the initial rapid increase in acidity begins. Then, when the solution has become slightly acid, but before the acidity has increased to about pH 4, the oxide or hydroxide begins to dissolve, and as it dissolves it neutralizes the hexamethylenetetramine salt. The ammonium salt of the strong acid, as soon as it has been incorporated in the solution, quickly uses up all the free formaldehyde in the solution, but a substantial part of the potential acidity thus produced is neutralized as the oxide or hydroxide dissolves.

Preferably the amount of the oxide or hydroxide in the solution is such that it is substantially all used up during the initial sudden generation of the hexamethylenetetramine salt, which occurs upon incorporation of the ammonium salt in the solution. The subsequent gradual increase in acidity, which occurs as the ammonium salt combines with the additional formaldehyde that is gradually split off from the formaldehyde-urea reaction product, can then take place unhampered, because the oxide or hydroxide has all been used up. This further increase in acidity is so gradual that there is plenty of time for applying the solution. A solution so prepared may remain stable for as long as twenty-four hours before it begins to harden or gel.

At the end of this period of stability or liquid life, the amount of additional formaldehyde that has been split off from the formaldehyde-urea reaction product and has reacted with the ammonium salt is such as to produce a sufficient quantity of the strongly acid hexamethylenetetramine salt to cause the adhesive to harden.

An important advantage of the present invention is that a large excess of an ammonium salt of a strong acid can be incorporated in the aqueous adhesive solution containing the oxide or hydroxide of magnesium or zinc without causing the solution to harden at an inconveniently rapid rate. The oxide or hydroxide may be used to neutralize a substantial part of the initial quantity of the hexamethylenetetramine salt that is generated immediately after the incorporation of the ammonium salt in the solution. The excess of the ammonium salt can then be converted into the strongly acid hexamethylenetetramine salt only as additional formaldehyde is split off from the formaldehyde-urea reaction product. Since the increase in acidity of such a solution can occur no more rapidly than the liberation of formaldehyde from the formaldehyde-urea reaction product, the excess of the ammonium salt does not cause the solution to become acid appreciably faster than it would if no such excess were present.

However, such an excess of the ammonium salt, which remains unreacted during the period of stability or liquid life of the solution, will finally become converted into the hexamethylenetetramine salt, so that the solution will eventually become very acid. Thus, after the solution has been applied as an adhesive, and after the expiration of the period of liquid life, more and more of the strongly acid hexamethylenetetramine salt is formed from the excess of the ammonium salt, and the hardening of the adhesive accelerates after it has been applied. The high ultimate acidity of the adhesive also causes very complete conversion of the formaldehyde-urea reaction product into the insoluble resin, so that a bond of high water resistance is produced.

For example, an adhesive can be prepared from ammonium chloride, water, a water-soluble formaldehyde-urea reaction product and the oxide or hydroxide of magnesium or zinc that takes five times as long to harden as an adhesive prepared in the same manner with the oxide or hydroxide and half of the ammonium chloride omitted. The latter adhesive hardens so rapidly that it cannot be used in ordinary commercial practice. Yet, after the latter adhesive has been applied, the resulting bond takes a week to attain its maximum strength, whereas a bond from the former adhesive attains its maximum strength in 24 hours.

It should be noted that when the present invention is carried out, the oxide or hydroxide of magnesium or zinc is neutralized by the hexamethylenetetramine salt of the strong acid, i. e., is converted into the magnesium or zinc salt of the strong acid. So long as there is a sufficient excess of the ammonium salt of the strong acid to produce the desired acidity, this magnesium or zinc salt which is present in the adhesive does not interfere in any respect with the hardening of the adhesive bond.

In the practice of the present invention, the ammonium salt of the strong acid may be incorporated in a solution that is to be applied as an adhesive, by simply adding water to the dry stable mixture hereinbefore described, by adding the ammonium salt together with the oxide or hydroxide of magnesium or zinc to an aqueous solution of a formaldehyde-urea reaction product, or by adding the ammonium salt to a suspension of the oxide or hydroxide in an aqueous solution of a formaldehyde-urea reaction product, or in any other desired manner. If desired, an aqueous adhesive containing all of the ingredients except the ammonium salt may be applied to one of the surfaces to be glued, and a solution of the ammonium salt then separately applied to the same surface or to the other surface to be glued. In any case, after the surfaces are brought together with the adhesive layer between, the ammonium salt causes the hardening of the formaldehyde-urea reaction product. Fillers or extenders may be used in the present adhesive if desired.

After an adhesive embodying the invention has been applied, the assembled surfaces to be glued can be held at ordinary temperatures while the adhesive hardens. Plywood panels and similar articles may be placed under pressure while the adhesive hardens. A heated press can be used to secure quick hardening of the adhesive, or plywood panels, after being clamped together, may be stored at an elevated temperature to hasten the hardening.

The amount of water used in preparing an adhesive solution in accordance with the invention is simply an amount sufficient to give the desired consistency, and will vary with different proportions of filler or extender.

The amount of the oxide or hydroxide of magnesium or zinc is simply an amount sufficient to give the desired delay in the hardening of the adhesive, and will depend upon the initial acidity or alkalinity of the formaldehyde-urea reaction product. For example, the weight of the oxide or hydroxide of magnesium or zinc may vary from about 0.1 to about 3.0 per cent of the weight of formaldehyde-urea reaction product. Of course the amount of the oxide or hydroxide used should not be so great as to retard unduly the hardening of the adhesive after it has been applied.

When the oxide or hydroxide of magnesium is employed, care should be taken to prevent carbonation, which would produce magnesium carbonate. If carbonation should occur, the absorbed carbon dioxide would be liberated as the adhesive became acid after the incorporation of the ammonium salt of the strong acid. The resulting bubbles of carbon dioxide might impair the adhesive bond. Carbonation of magnesium oxide or hydroxide that is suspended in an aqueous solution of a formaldehyde-urea reaction product can be prevented by shipping the solution in a sealed container. If the initial solution of the formaldehyde-urea reaction product is to be evaporated in order to produce a solid product for shipment, the magnesium oxide or hydroxide is preferably suspended in the solution prior to evaporation, instead of being mixed with the dried reaction product. If the particles of magnesium oxide or hydroxide are suspended in the solution prior to evaporation, they are coated with the formaldehyde-urea reaction product in the dried solid, and are thus afforded considerable protection against carbonation.

The amount of the ammonium salt of the strong acid that is employed is simply an amount sufficient to cause the adhesive to harden properly after being applied. The amount of the ammonium salt of the strong acid, such as ammonium sulfate, ammonium chloride, ammonium bromide or ammonium thiocyanate, should at least be the approximate chemical equivalent of the amount of the oxide or hydroxide of magnesium or zinc. If an ammonium salt of a strong organic acid such as ammonium oxalate, as distinguished from an ammonium salt of a strong mineral acid such as ammonium chloride, is employed, a still greater amount of the salt must be used, because the organic acid is not as strong as the mineral acid. An increased amount of the ammonium salt of a strong acid must also be employed if the adhesive is allowed to harden at ordinary temperatures, because the hardening of a formaldehyde-urea reaction product in the presence of an acid hardening agent is much slower and less complete at ordinary temperatures than at elevated temperatures.

In carrying out the present invention, any water-soluble formaldehyde-urea reaction product may be employed that has the proper solubility to form an aqueous solution of the desired concentration. Such a reaction product is most readily obtained by reacting formaldehyde and urea in an aqueous solution.

Although an aqueous composition prepared in accordance with the invention is particularly useful as an adhesive, it may also be used as a coating or impregnating composition, or for other purposes.

Example 1

1 mol of urea is added to a 37 per cent aqueous solution containing 2 mols of formaldehyde that has been brought to pH 4.5–5.5 by means of sodium hydroxide. The solution is then gently refluxed long enough (about 2 hours) to carry the condensation to a suitable stage, after which the solution is neutralized. The solution may then be evaporated to the desired concentration for shipment or use. 1 part of finely divided zinc oxide for every 200 parts of formaldehyde-urea reaction product may be suspended in the solution before shipment, or may be added when the solution is being prepared for use as an adhesive. In either case, about 2 parts of ammonium chloride for every 100 parts of formaldehyde-urea reaction product may be added to the solution when it is ready for use as an adhesive, in order to cause it to harden after it has been applied.

Example 2

An aqueous solution of a formaldehyde-urea reaction product prepared in accordance with the foregoing example, after being neutralized, is diluted with water or evaporated under vacuum to the proper concentration for spray-drying or vacuum drum-drying. With 100 parts of the dried granular formaldehyde-urea reaction product are mixed ½ part of zinc oxide and 2 parts of ammonium sulfate. The resulting dry mixture is stable for an indefinite period. Whenever it is to be used, sufficient water is added to produce the desired consistency. The resulting aqueous composition has delayed-hardening properties, and may be used as an adhesive or as an impregnating agent.

Various embodiments of the invention may be devised to meet various requirements.

Having described my invention, I claim:

1. A stable dry adhesive composition comprising a water-soluble formaldehyde-urea reaction product and a substance selected from the group consisting of magnesium oxide, magnesium hydroxide, zinc oxide and zinc hydroxide, in admixture with a quantity of an ammonium salt of a non-volatile strong acid that is not less than the approximate chemical equivalent of the quantity of said substance, said composition, upon addition of water, forming an adhesive having delayed-hardening properties.

2. A stable dry adhesive composition comprising a water-soluble formaldehyde-urea reaction product and a quantity of a substance selected from the group consisting of magnesium oxide, magnesium hydroxide, zinc oxide and zinc hydroxide in admixture with a quantity of ammonium sulfate that is not less than the approximate chemical equivalent of the quantity of said substance, said composition, upon addition of water, forming an adhesive having delayed-hardening properties.

3. An adhesive having delayed-hardening properties comprising a composition prepared from water, a water-soluble formaldehyde-urea reaction product, a substance selected from the group consisting of magnesium oxide, magnesium hydroxide, zinc oxide and zinc hydroxide, and a quantity of an ammonium salt of a strong acid that is not less than the approximate chemical equivalent of the quantity of said substance.

WILLIAM C. DEARING.